Nov. 22, 1955     E. MILLER ET AL     2,724,207
FISHHOOK REMOVER
Filed Dec. 22, 1952
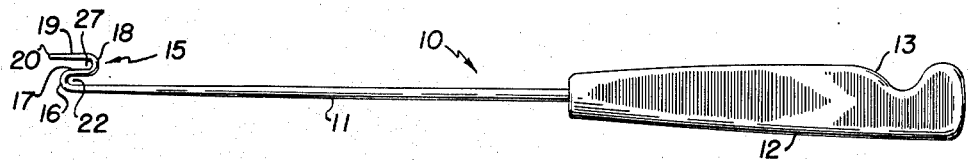
Fig. 1.
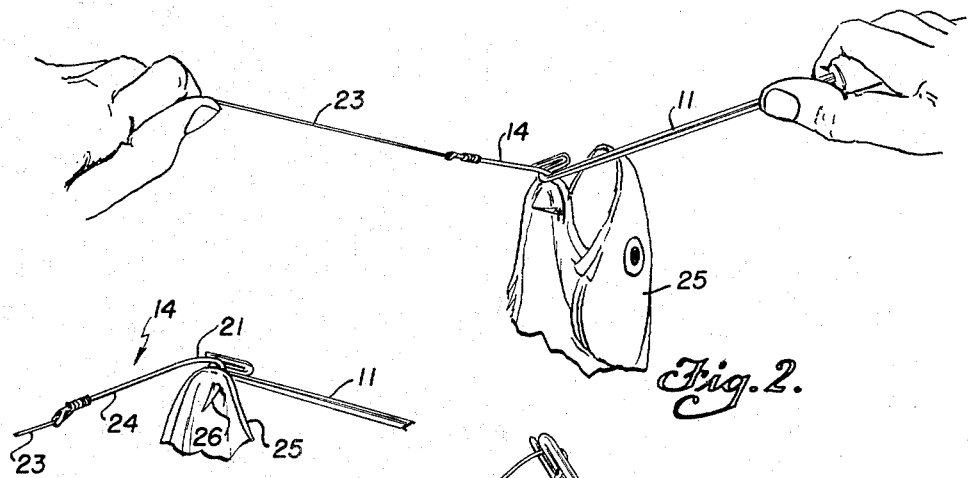
Fig. 2.
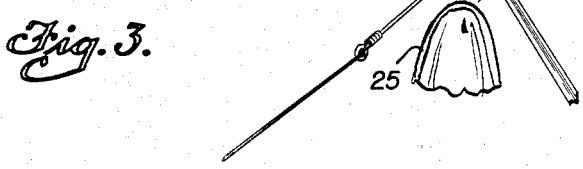
Fig. 3.
Fig. 4.
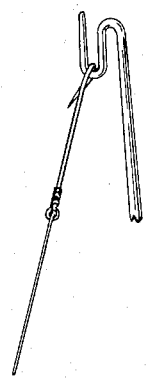
Fig. 5.
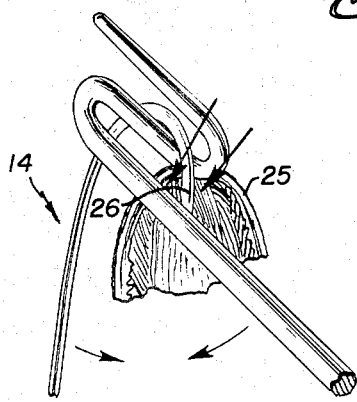
Fig. 6.
EARL MILLER
EARL J. MILLER
    INVENTORS
BY *Herbert J. Brown*
ATTORNEY

United States Patent Office 2,724,207
Patented Nov. 22, 1955

2,724,207
FISHHOOK REMOVER

Earl Miller and Earl J. Miller, Fort Worth, Tex.

Application December 22, 1952, Serial No. 327,292

1 Claim. (Cl. 43—53.5)

This invention relates to fishhook removers such as those used to avoid placing the hands on fish when fishing. It is well known that such handling accounts for considerable loss of fish, particularly those thrown back by reason of being under size. The use of a fishhook remover is also desirable for preventing the slime from certain fish from getting in the fisherman's eyes, and for preventing accidental piercing of the hands with fishhooks or by the fins of the fish.

An object of the invention is to provide a fishhook extractor capable of nearly complete rotation around the bend of the fishhook, and whereby the fishhook may be removed therefrom without material injury to the fish.

Another object of the invention is to provide a fishhook remover capable of retaining the hook thereon throughout the operation referred to in the foregoing object.

A further object of the invention is to provide a fishhook remover having a handle shaped whereby the operating part of the remover is normally grasped in the correct operating position.

The invention will be readily understood from the following description and the accompanying drawing, wherein:

Figure 1 is a side elevation of a fishhook remover embodying the features of the invention.

Figures 2 through 5 progressively illustrate the operation of the fishhook remover when removing a hook from a fish.

Figure 6 is an enlarged perspective view showing the direction of movement of the remover shank and the fishhook shank, together with the relative position of the hook with reference to the fish's mouth. The directions and pressures applied are shown by means of arrows.

The fishhook remover 10 shown in Figure 1 includes a straight shank 11 having a flat handle 12 secured to one end thereof. A finger notch 13 is formed in one end of the handle 12 near the outer end thereof, and whereby the operating mechanism to be described is normally and naturally arranged outwardly from the user for conveniently removing a fishhook, such as 14.

An S-shaped tool 15 is formed by 180° reverse bends in the end of the shank 11 opposite the handle 12, and the plane defined by said S-shaped tool is on the same side of the shank as the notch 13 in said handle. Specifically, the tool 15 is rearwardly curved, as at 16, continues rearwardly to provide an intermediate portion 17 parallel with the shank 11, is thence forwardly bent, as at 18, and is thence forwardly directed to provide a projecting prong portion 19. The shank 11, the intermediate portion 17, and the prong 19 are all substantially parallel with each other. Preferably, the outer tip 20 of the prong portion 19 extends outwardly beyond the foremost end of the first described bend 16.

In operation, the bend 21 of the hook 14 is placed around the shank 11 and is drawn into the hook portion 22 formed by the shank 11, first described bend 16, and the intermediate portion 17. The last described operation is clearly shown in Figure 2, and in which the hook 14 is held taut by means of the line or leader 23. Still holding the line 23 taut, an angle is formed between the length of the tool shank 11 and shank 24 of the hook 14. The last referred to operation causes the flesh of the fish 25 to bear against the tool shank 11, as shown in Figure 3. Continued movement between the tool shank 11 and the hook shank 24, and the resulting rotation of the hook bend 21 within the first described hook portion 22 draws the hook barb 26 through the flesh of the fish 25 in the same direction that the same entered, releasing the fish as shown in Figure 4. During the last described operation, the bend 21 of the fishhook 14 is received within the outer hook 27 formed by the intermediate portion 17 and the forwardly directed prong portion 19; thus, after the fish has been released, the hook 14 is still supported, thereby preventing the same from injuring the fisherman.

The operation which takes place immediately prior to the action illustrated in Figure 4 is shown in detail in Figure 6. The flesh of the fish 25 is supported on the opposite sides of the fish barb 26 by the shank 11 and the intermediate side 17, thus applying pressure as shown by means of the upper arrows in the figure last referred to. The rotating action of the hook 14 and the barb 26 thereon causes very little damage to the fish 25. In the event the hook 14 is swallowed by the fish 25, the same described action may be carried out, but in which event it may be desirable to rotate and swing the fish 25 about the remover 10 by a quick movement of the hands. When using the hook remover 10 for very large fish, the first described operation is carried out while holding such fish by means of one foot.

The invention is not limited to the construction herein shown and described but may be varied within the scope of the appended claim.

What is claimed is:

A fishhook remover comprising a straight shank having a handle at one end thereof and an S-shaped hook removing tool at the other end thereof, said tool being formed by 180° reverse bends of the shank to provide a straight rearwardly directed intermediate portion and a prong portion which is straight and forwardly directed relative to the length of the shank and the intermediate portion, said intermediate and prong portions being formed substantially parallel to but spaced from said shank and each other and adapted to receive a fishhook therebetween.

References Cited in the file of this patent

UNITED STATES PATENTS

| 1,439,860 | Breen | Dec. 26, 1922 |
| 2,289,767 | Ford | July 14, 1942 |
| 2,491,763 | Raisanen | Dec. 20, 1949 |

FOREIGN PATENTS

| 8,433 | Great Britain | 1897 |